(12) United States Patent
Bares et al.

(10) Patent No.: US 9,249,898 B2
(45) Date of Patent: Feb. 2, 2016

(54) FAUCET ASSEMBLY

(71) Applicant: Kohler Co., Kohler, WI (US)

(72) Inventors: William R. Bares, Fredonia, WI (US);
Joseph S. Blake, Sheboygan, WI (US);
Margaret C. Mazz, Sheboygan, WI (US);
Sarah S. Fitzsimmons, Fond du Lac, WI (US);
Christine N. Meyer, Sheboygan Falls, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 13/797,297

(22) Filed: Mar. 12, 2013

(65) Prior Publication Data
US 2014/0261820 A1     Sep. 18, 2014

(51) Int. Cl.
*F16K 31/60* (2006.01)

(52) U.S. Cl.
CPC ............. *F16K 31/602* (2013.01); *F16K 31/607* (2013.01); *Y10T 16/469* (2015.01); *Y10T 137/9464* (2015.04)

(58) Field of Classification Search
CPC ............ F21V 21/403; A61B 2019/5208; F16K 31/60; F16K 31/602; F16K 31/605; F16K 31/607; Y10T 16/48; Y10T 16/469; Y10T 16/4713; Y10T 16/466; Y10T 16/498; Y10T 16/476; Y10S 16/904; Y10S 16/906

USPC ........... 16/430, 422, 426, 421, 436, 431, 904, 16/906; 137/315.15, 315.12, 359
See application file for complete search history.

(56) References Cited

U.S. PATENT DOCUMENTS

| | | | |
|---|---|---|---|
| 1,629,449 A * | 5/1927 | Bethune | 403/258 |
| 4,353,139 A | 10/1982 | Wainwright et al. | |
| 4,479,736 A * | 10/1984 | Evans et al. | 403/287 |
| 4,890,355 A | 1/1990 | Schulten | |
| 4,941,232 A | 7/1990 | Decker et al. | |
| 5,065,296 A * | 11/1991 | Cude | 362/399 |
| 5,465,461 A | 11/1995 | Sandel | |
| 5,669,102 A * | 9/1997 | Sandel | 16/421 |
| 6,138,292 A | 10/2000 | O'Toole | |
| 6,341,617 B1 * | 1/2002 | Wilson | 137/119.04 |
| 6,754,936 B2 | 6/2004 | Erenaga | |
| 7,013,533 B2 * | 3/2006 | Lumpkin | 16/421 |
| 7,877,843 B2 * | 2/2011 | Holland-Letz | 16/436 |
| 8,484,806 B2 * | 7/2013 | Rarick | 16/431 |
| 2004/0068844 A1 * | 4/2004 | Lumpkin | 16/421 |
| 2006/0230576 A1 | 10/2006 | Meine | |
| 2007/0209161 A1 | 9/2007 | Neering et al. | |

* cited by examiner

*Primary Examiner* — Jeffrey O Brien
(74) *Attorney, Agent, or Firm* — Foley & Lardner LLP

(57) ABSTRACT

A handle assembly for a faucet that includes a silicone member configured to slide over and be removable coupled to a faucet handle, wherein the silicone member comprises an opening in which the faucet handle may be received and an external surface that may be gripped by a user. A faucet handle may include a longitudinal groove used to allow air to escape from the opening of the silicone member. The handle assembly does not require additional elements to couple the silicone member to the faucet handle.

22 Claims, 5 Drawing Sheets

FAUCET ASSEMBLY

BACKGROUND

The present disclosure relates generally to faucet assemblies, and more particularly, to a handle for a faucet assembly. A faucet, such as a faucet used to supply water for a kitchen or bathroom sink, generally includes one or more handles to control the flow and/or temperature of water that is dispensed from a faucet spout. Such handles for a faucet may come in many shapes and sizes, and may be made from a variety of materials. Typically, a faucet handle is coupled to a valve assembly of a faucet, and a user may pivot or rotate the faucet handle to control the valve assembly and regulate the flow and temperature of water dispensed from the faucet spout. A faucet handle may couple to the valve assembly in a variety of ways. Fasteners, such as a threaded screw, may be used to couple a faucet handle to a valve. A handle for a faucet may be integrally formed with the valve assembly. For instance, a faucet handle may be molded as part of the valve assembly for a faucet. Other faucet handles may include an end with a threaded hole, and the handle may threadably couple to an extension of the valve assembly. Various embodiments disclosed herein are related to an improved faucet and handle assembly.

SUMMARY

One embodiment of the disclosure relates to a handle assembly for a faucet. The handle assembly includes a handle and a silicone member that is configured to slide over and be removable coupled to the handle. The silicone member includes an opening in which the handle may be received and an external surface that may be gripped by a user.

Another embodiment of the disclosure relates to a faucet that includes a spout and a handle assembly that is configured to control the flow of water from the spout. The handle assembly includes a handle and a silicone member that is configured to be removable coupled to the handle. The silicone member includes an opening in which the faucet handle may be received and an external surface that may be gripped by a user. Further, the faucet handle includes a first end that is received by the silicone member and a longitudinal recess extending from the first end and along at least a portion of the length of the handle.

Yet another embodiment of the disclosure relates to a cover for a handle of a faucet. The cover includes a silicone member that is configured to be removably coupled to a faucet handle. The silicone member includes an opening in which the faucet handle may be received and an external surface that may be gripped by a user, the perimeter of the opening of the silicone member is smaller than the perimeter of a first end of the faucet handle received within the opening.

DETAILED DESCRIPTION

Generally, faucet handles are not designed to be periodically removed from the faucet assembly. This is not to say that faucet handles are generally incapable of being removed. Rather, faucet handles typically remain fixed to the faucet assembly, and if the faucet handle needs to be cleaned, a user may typically clean the faucet handle in its fixed position. In some cases, a user may need to periodically adjust, or tighten, a faucet handle (i.e., when a faucet handle is coupled to a faucet assembly using a fastener).

In some cases, it would be desirable for a faucet handle to be easily removable from the faucet assembly. For example, in order to wash a faucet handle in a sink or dishwasher, it may be desirable for the handle to be easily removable. Also, if a user would like to replace a faucet handle with another handle having different features, it may be desirable for the handle to be easily removable.

Figure 1:
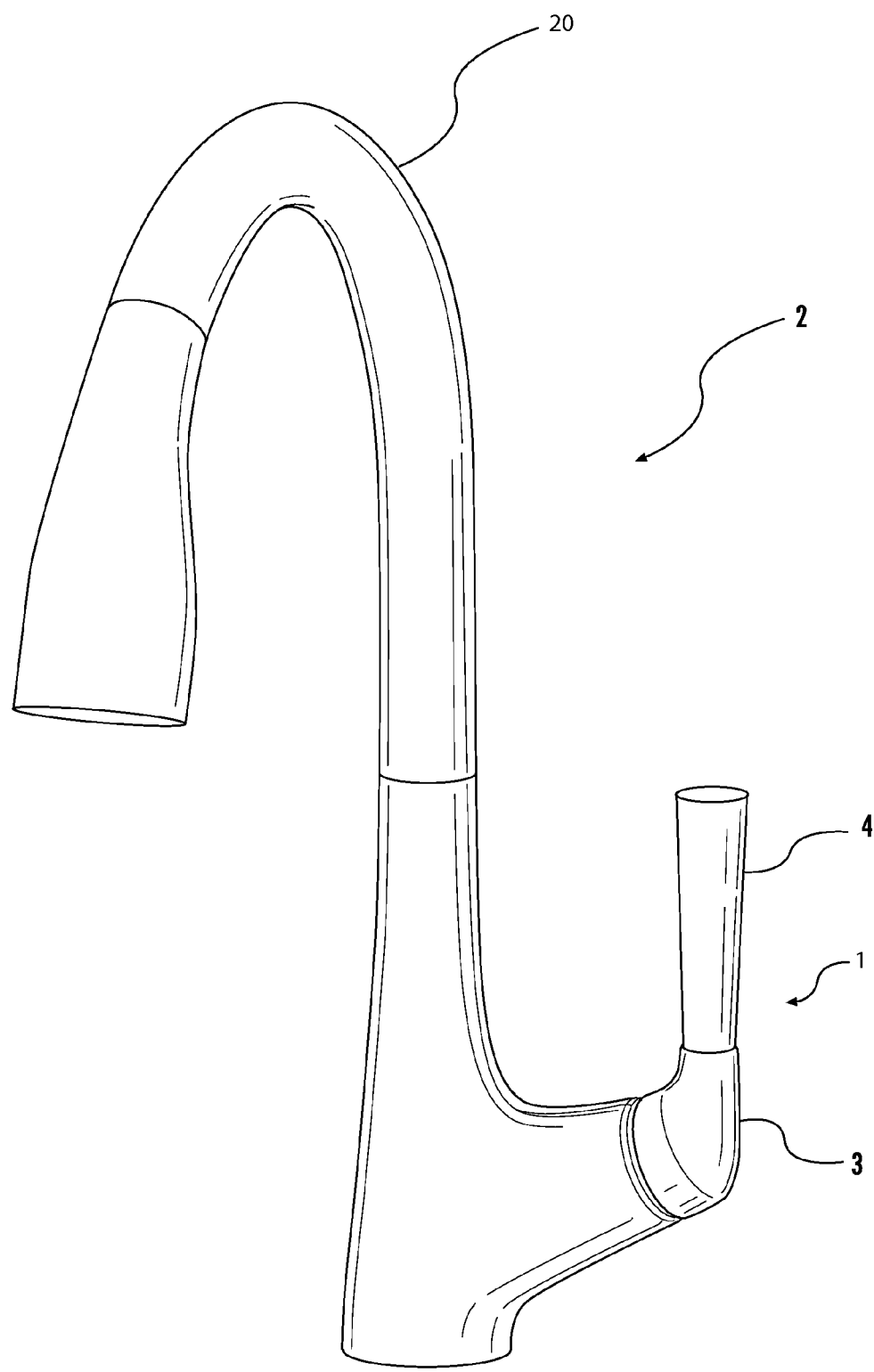
FIG. 1 is a perspective view of a faucet assembly according to an exemplary embodiment.
Figure 2:
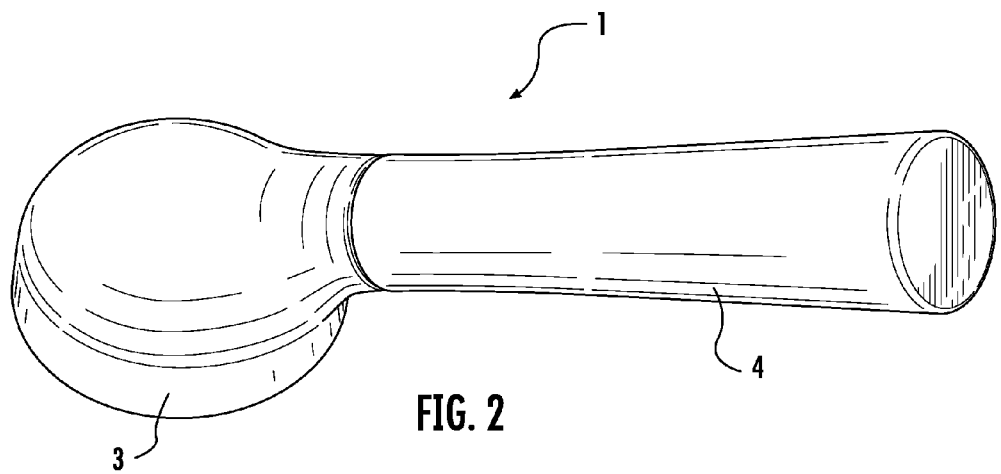
FIG. 2 is a perspective view of a faucet handle assembly usable with the faucet assembly of FIG. 1 according to an exemplary embodiment.
Figure 3:
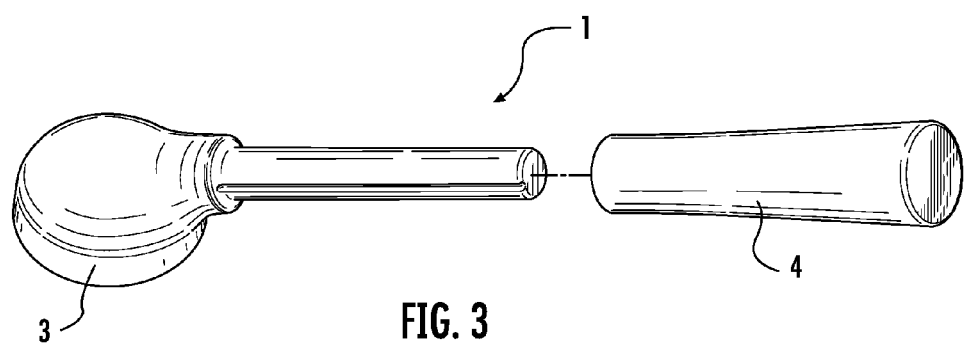
FIG. 3 is an exploded perspective view of the faucet handle assembly shown in FIG. 2 according to an exemplary embodiment.

Referring now to FIG. 1, and according to an exemplary embodiment, a faucet assembly 2 may include a faucet spout 20 and a faucet handle assembly 1. A single faucet handle 3 of the faucet handle assembly 1 may be used to control the amount and/or temperature of water dispensed from faucet spout 20. According to alternative embodiments, two or more faucet handles may be used to control water from different sources. Handle assembly 1 may include a cover 4 that is configured to be removable from faucet handle 3.

Figure 8:
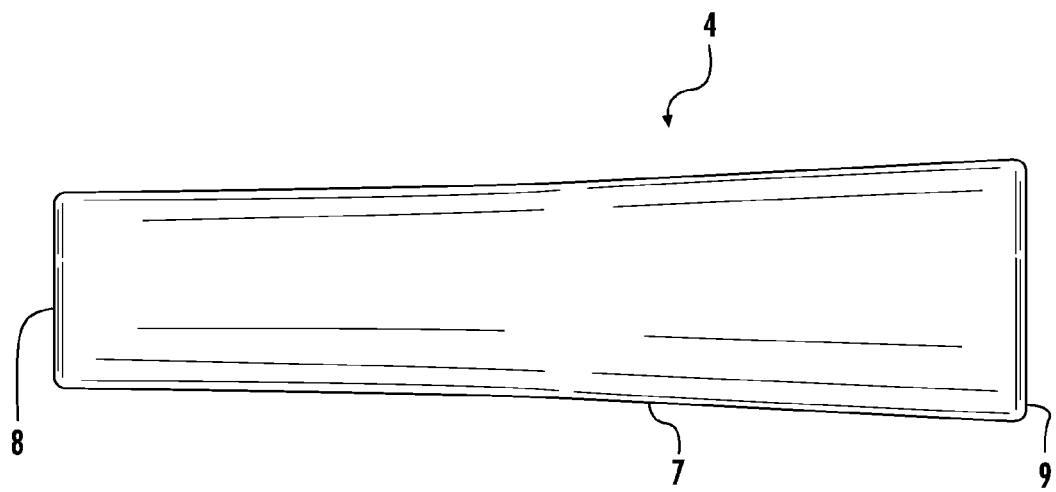
FIG. 8 is a side view of a cover for a faucet handle according to an exemplary embodiment.

Referring to FIG. 8, cover 4 may include a first end having an opening 8. A central bore 5 may be defined by opening 8 of cover 4. Although this disclosure is not intended to limit the materials that may be used to make cover 4, according to an exemplary embodiment, cover 4 may be a silicone cover made out of silicone rubber. For example, a silicone rubber material may be injection molded to form cover 4 so that an inner surface of bore 5 is configured to be retained against faucet handle 3. For example, a surface finish of cover 4 may provide sufficient adhesion to retain cover 4 against faucet handle 3 when a user grasps cover 4 and operates the faucet handle. In some embodiments, opening 8 of cover 4 may have an inner diameter which is smaller than the outer diameter of faucet handle 3 prior to installing cover 4 onto handle 3. Therefore, opening 8 and/or bore 5 of cover 4 may be configured to stretch in order to receive faucet handle 3, and an elastic compressive force may be used to hold or retain cover 4 against faucet handle 3.

According to another exemplary embodiment, cover 4 may be configured such that opening 8 and/or bore 5 of cover 4 may have outer diameters that are equal to or greater than an outer diameter of faucet handle 3.

Figure 9:
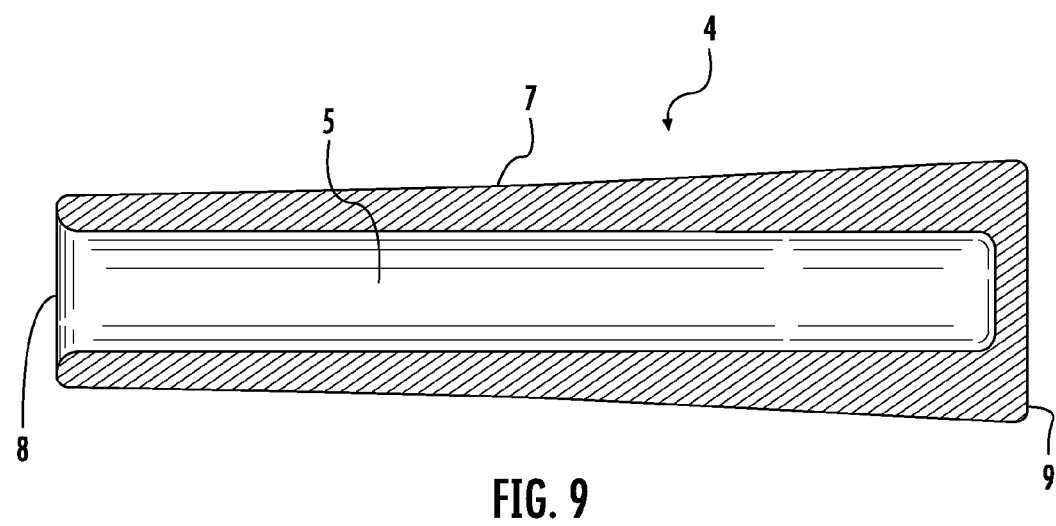
FIG. 9 is a cross-sectional view of the cover shown in FIG. 7 according to an exemplary embodiment.

Referring to FIGS. 8-9, cover 4 for faucet handle 3 may include an exterior surface 7 that is configured to be grasped by a hand of a user. As shown in FIG. 9, and according to an exemplary embodiment, exterior surface 7 of cover 4 may be tapered from an end proximate opening 8, and having a relatively smaller diameter, toward an end 9 opposite opening 8, and having a relatively larger diameter. In alternative embodiments, exterior surface 7 may be cylindrically shaped, or may have another polygonal shape (i.e., a hexagonal exterior or star-shaped exterior, etc.).

Referring to FIGS. 3-6, faucet handle 3 may include an elongated member shown as a rod 10 (e.g., a bar, elongated member, cylindrical portion, etc.) which is configured to receive bore 5 of cover 4. Rod 10 may have a uniform diameter across its length, and the outer diameter of rod 10 may in some embodiments be larger than the inner diameter of bore 5 of cover 4 (prior to installation of cover 4 onto handle 3). As noted above, in alternative embodiments, rod 10 may have an outer diameter that is less than the inner diameter bore 5. According to an exemplary embodiment, faucet handle 3 may be die-cast out of a zinc alloy. According to alternative embodiments, handle 3 may be made out of various other materials, including other metals, a polymeric material, composite materials, etc.

Figure 4:
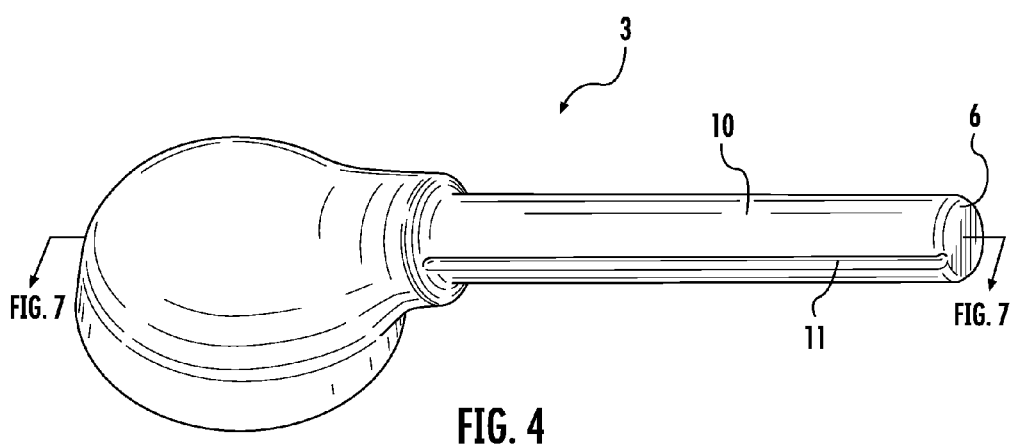
FIG. 4 is a perspective view of a faucet handle according to an exemplary embodiment.
Figure 5:
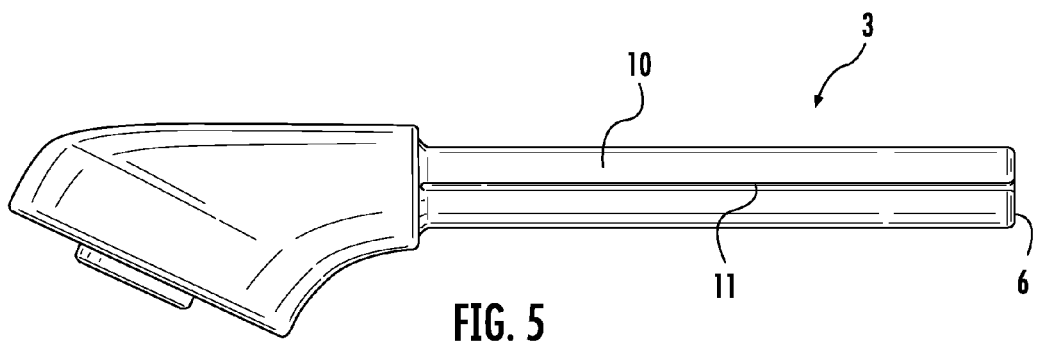
FIG. 5 is a side view of the faucet handle shown in FIG. 4 according to an exemplary embodiment.
Figure 6:
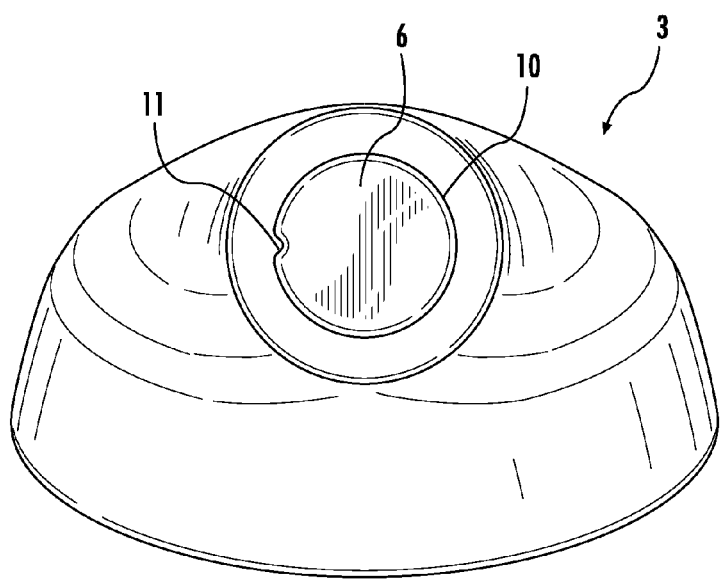
FIG. 6 is a front view of the faucet handle shown in FIG. 4 according to an exemplary embodiment.
Figure 7:
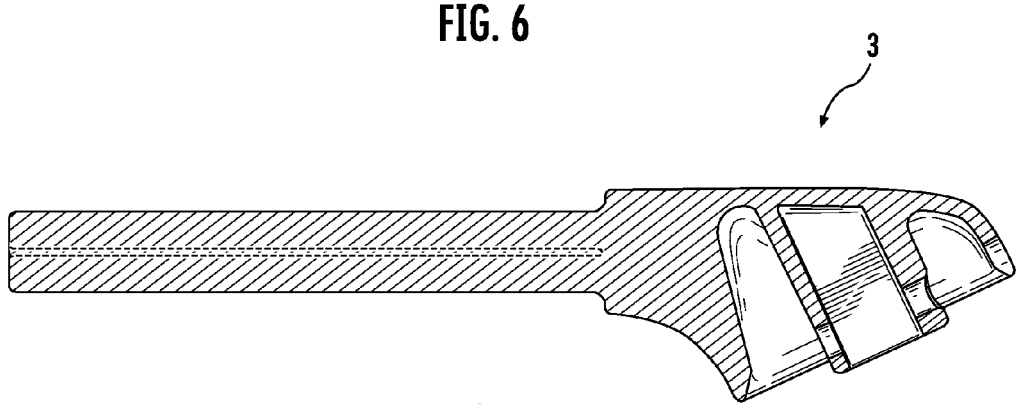
FIG. 7 is a cross-sectional view of the faucet handle shown in FIG. 4 according to an exemplary embodiment.

As shown in FIGS. 4-6, rod 10 may have a longitudinal groove 11 (e.g., a recess, channel, etc.) along all or at least a portion of its length. Longitudinal groove 11 may be U-shaped, or have a curvature that is convex along a portion of the length of rod 10. Alternatively, longitudinal groove 11 may be configured as a keyed slot. In other words, longitudinal groove 11 may have a bottom surface, as well as two side surfaces that are perpendicular to the bottom surface. Longitudinal groove 11 may be configured to allow air to escape from bore 5 of cover 4, as cover 4 is slid over rod 10, thereby facilitating assembly of cover 4 onto faucet handle 3. Longitudinal groove 11 may also be used to restrict rotational movement of the cover 4 around the rod 10 of the faucet handle 3. For example, in an embodiment in which the inner diameter of bore 5 of cover 4 is smaller than the outer diameter of rod 10, a portion of cover 4 may be forced into longitudinal groove 11 along at least a portion of the length of rod 10, thereby limiting the rotational movement of cover 4 about rod 10.

According to an exemplary embodiment, rod 10 of faucet handle 3 and bore 5 of cover 4 are cylindrical (e.g., have generally corresponding cylindrical shapes to facilitate the assembly and disassembly of the components). According to alternative embodiments, rod 10 and bore 5 may have different cross-sections (i.e., square, rectangular, multi-sided, etc.), that may generally correspond with each other or that may have differing configurations.

Referring to FIG. 9, opening 8 of cover 4 may curve radially outwards (e.g., taper, flare, etc.) toward exterior surface 7 of cover 4. Such an opening may facilitate positioning of the cover 4 over the faucet handle 3 (e.g., by providing a relatively larger diameter opening at the end of cover 4 which initially receives handle 3). As shown in FIG. 5, first end 6 of faucet handle 3 may include a rounded outside edge, which may also facilitate positioning of cover 4 over faucet handle 3.

In some embodiments, cover 4 for the handle assembly 1 may advantageously be a removable cover that is easily removable and interchangeable. Cover 4 may slide over faucet handle 3, and other elements (i.e. fasteners, adhesive) may not be necessary to couple cover 4 to faucet handle 3 and retain cover 4 securely in position during use, yet allow removal, replacement, etc. of cover 4 when desired. It may be desirable for faucet handle assembly 1 to include a removable cover, such as cover 4, to facilitate cleaning cover 4 in a dishwasher or a sink. In addition, a user may easily interchange cover 4 with a different cover, as the user finds necessary, or to satisfy the décor of a kitchen or bathroom.

A removable or interchangeable cover, such as cover 4 for handle assembly 1 may be made from a material other than silicone rubber. For example, in various alternative embodiments, any material that may be configured to removably couple to a faucet handle may be used in connection with cover 4.

Figure 10:
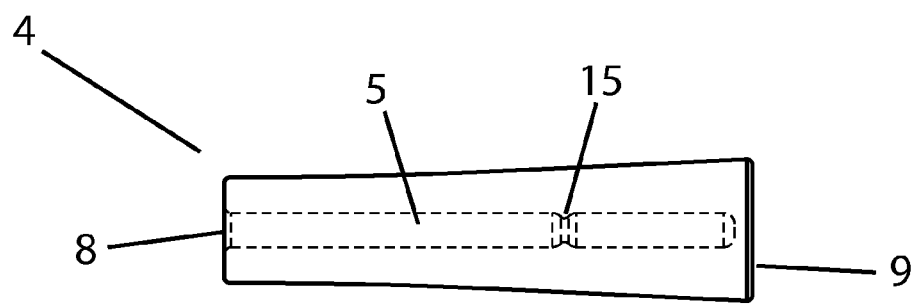
FIG. 10 is a side view of a cover for a faucet handle according to an alternative embodiment.
Figure 11:
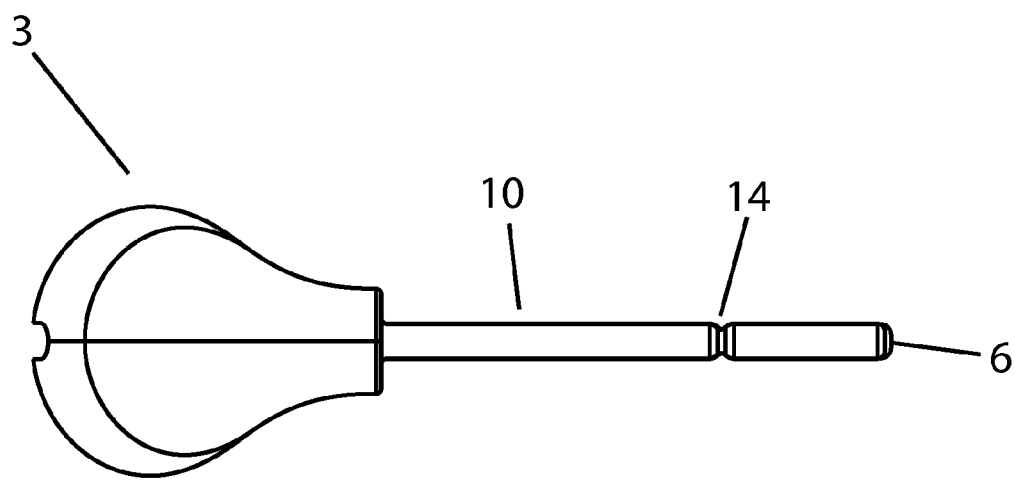
FIG. 11 is a top view of a faucet handle according to an alternative embodiment.
Figure 12:
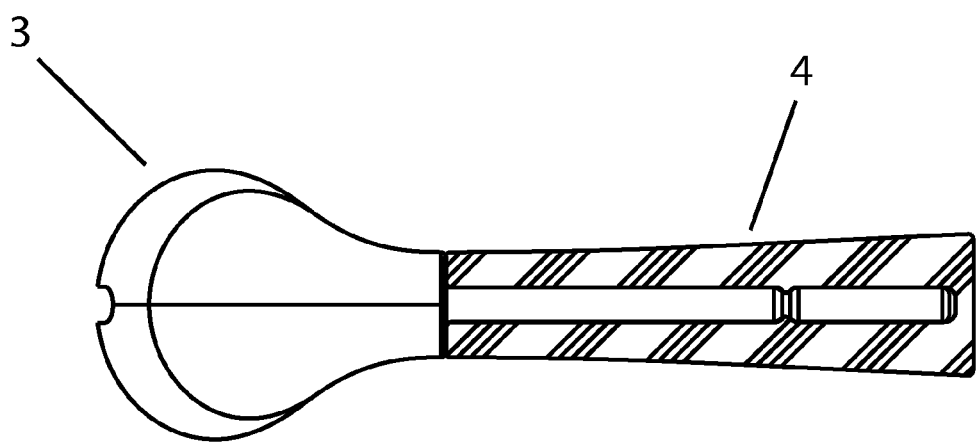
FIG. 12 is a top view of a faucet handle assembly according to an alternative embodiment. The faucet handle is shown as a solid part and the cover is shown as a cross-section.

As shown in FIGS. 10-12, in an alternative embodiment, handle 3 may include an annular groove 14 (e.g., a recess, channel, slot, etc.) and cover 4 may include a annular protrusion 15 (e.g., a projection, etc.). Annular groove 14 may be configured to receive annular protrusion 15 when cover 4 is coupled to the handle 3. In some embodiments, groove 14 and/or projection 15 may extend 360 degrees about each other. In other embodiments, groove 14 and/or projection 15 may extend about each for less than 360 degrees in an arcuate/semi-circular fashion. Other configurations of groove 14 and/or projection 15 are possible according to various other embodiments. Furthermore, it should be noted that the features of the groove/projection shown in FIGS. 10-12 may be used in combination with any of the other features of the faucet assembly disclosed herein.

One skilled in the art will readily appreciate the benefits of a removable and interchangeable cover for a faucet handle assembly. For example, when it becomes desirable to clean a faucet handle assembly, a user may simply pull the cover from the faucet handle, and use a dishwasher to wash it, or wash it by hand in a sink.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the faucet handle assembly as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A handle assembly for a faucet, the handle assembly comprising:
   a faucet handle defining a cylindrical portion extending from an end to a flange portion and having a constant outer diameter between the end and the flange portion; and
   a silicone cover configured to slide over and be removably coupled to the faucet handle, wherein the silicone cover comprises an opening configured to receive the faucet handle and an external surface configured to be gripped by a user;
   wherein the silicone cover comprises an internal bore extending from the opening to a closed end, the internal bore having a constant diameter along a substantial length of the cover;
   wherein the faucet handle includes a longitudinal groove extending from the end to the flange portion; and
   wherein the constant diameter of the internal bore is less than the constant outer diameter of the faucet handle such that at least a portion of the silicone cover is forced into the longitudinal groove when the silicone cover is slid over the faucet handle due at least to the size differential between the internal bore and the faucet handle.

2. The assembly of claim 1, wherein the silicone cover is injection molded.

3. The assembly of claim 1, wherein an inner surface of the internal bore of the silicone cover is generally smooth.

4. The assembly of claim 1, wherein the longitudinal groove is configured to allow air to escape from the internal bore of the silicone cover when the silicone cover is assembled onto the faucet handle.

5. The assembly of claim 4, wherein surface tensions of the internal bore and the faucet handle are configured to operably retain the silicone cover to the faucet handle.

6. The assembly of claim 4, wherein the longitudinal groove is U-shaped.

7. The assembly of claim 1, wherein the opening of the silicone cover is curved outward toward the external surface.

8. The assembly of claim 1, wherein the faucet handle is die cast from a zinc alloy.

9. The assembly of claim 1, wherein an elastic compressive force holds the silicone cover against the faucet handle.

10. A faucet assembly, comprising:
    a spout;
    a handle assembly configured to control the flow of water from the spout, the handle assembly comprising:
       a handle defining a cylindrical portion extending from a first end to a flange portion and having a constant outer diameter between the end and the flange portion; and
       a silicone member configured to be removably coupled to the handle, wherein the silicone member comprises an opening configured to receive the handle and an external surface configured to be gripped by a user;
       wherein the silicone member comprises an internal bore extending from the opening to a closed end, the internal bore having a constant diameter along a substantial length of the cover;
       wherein the handle first end is received by the silicone member and comprises a straight recess extending longitudinally from the first end to the flange portion; and
       wherein the constant diameter of the internal bore is less than the constant outer diameter of the handle such that a portion of the silicone member is forced into the straight recess when the handle is received by the silicone member due at least to the size differential between the internal bore and the handle.

11. The faucet assembly of claim 10, wherein an interface defined by an internal surface of the silicone member and an external surface of the handle directly couples the silicone member to the handle.

12. The faucet assembly of claim 10, wherein surface tension between the bore and the handle is configured to operably retain the silicone member to the handle.

13. The faucet assembly of claim 12, wherein a perimeter of the opening of the silicone member is smaller than an outer perimeter of the handle.

14. The faucet assembly of claim 12, wherein the straight recess is configured to allow air to escape from the bore of the silicone member when the silicone member is assembled onto the handle.

15. The faucet assembly of claim 10, wherein the opening of the silicone member is curved outward toward the external surface.

16. The faucet assembly of claim 10,
    wherein the portion of the silicone member resists relative rotation with the handle when the silicone member is coupled thereto.

17. A handle assembly for a faucet, the handle assembly comprising:
    a faucet handle comprising a rod, the rod having constant cross-section extending from an end to a flange portion;
    a silicone cover configured to be removably coupled to the rod, wherein the silicone cover comprises a generally smooth inner surface defining an opening configured to receive the rod and an external surface configured to be gripped by a user;
    wherein a perimeter of the opening of the silicone cover is smaller than an outer perimeter of a portion of the rod which is received within the opening;
    wherein the silicone cover comprises an internal bore extending from the opening to a closed end, the internal bore having a constant diameter along a substantial length of the cover;
    wherein a straight groove extends longitudinally along a portion of the rod from the end to the flange portion; and
    wherein the constant diameter of the internal bore is less than the constant cross-section of the rod such that a portion of the silicone cover is forced into the straight groove when the rod is received by the silicone cover due at least to the size differential between the internal bore and the rod.

18. The handle assembly of claim 17, wherein the opening curves outward.

19. The handle assembly of claim 17, wherein the silicone cover is injection molded.

20. The handle assembly of claim 17, wherein the exterior surface of the silicone cover tapers from the closed end to the opening.

21. The handle assembly of claim 17, wherein the cover is configured to enable air to escape along the groove.

22. The handle assembly of claim 17,
wherein the portion of the silicone cover resists relative rotation with the rod when the silicone cover is coupled thereto.

\* \* \* \* \*